(12) United States Patent
Ziegler

(10) Patent No.: US 6,816,052 B1
(45) Date of Patent: Nov. 9, 2004

(54) TRACK LITZ RUNGS AND SHORTING BAR DESIGN FOR URBAN MAGLEV INDUCTRACK AND METHOD FOR MAKING THE SAME

(76) Inventor: Edward Ziegler, 9840 York Alpha Park Unit F, North Royalton, OH (US) 44133

( * ) Notice: Subject to any disclaimer, the term of this patent is extended or adjusted under 35 U.S.C. 154(b) by 0 days.

(21) Appl. No.: 10/705,647

(22) Filed: Nov. 10, 2003

(51) Int. Cl.[7] ................................................. H01F 5/00
(52) U.S. Cl. ................ 335/299; 174/102 R; 174/128.1; 29/602.1; 29/825; 104/2; 104/286
(58) Field of Search .............................. 104/2, 281–286; 174/102 R, 128.1; 335/299; 29/602.1, 825

(56) References Cited

U.S. PATENT DOCUMENTS

| | | | | |
|---|---|---|---|---|
| 5,388,527 A | * | 2/1995 | Thornton | 104/284 |
| 5,722,326 A | * | 3/1998 | Post | 104/281 |
| 5,804,892 A | * | 9/1998 | Schwan et al. | 307/104 |
| 6,051,793 A | * | 4/2000 | Byrne et al. | 174/120 R |
| 6,510,799 B2 | * | 1/2003 | Lamb et al. | 104/281 |
| 6,629,503 B2 | * | 10/2003 | Post | 104/281 |
| 6,633,217 B2 | * | 10/2003 | Post | 335/306 |

* cited by examiner

*Primary Examiner*—Ramon M. Barrera

(57) ABSTRACT

Improved Litz track rungs for urban Maglev Inductrack use are provided using an anneal, stainless steel square tube cut to length. A square packed Litz cable is installed within the square tube and compression of the rail is done using a punch press or brake to compact and compress the rail, thereby minimzing electrical resistance and increasing overall electrical conductivity of

12 Claims, 4 Drawing Sheets

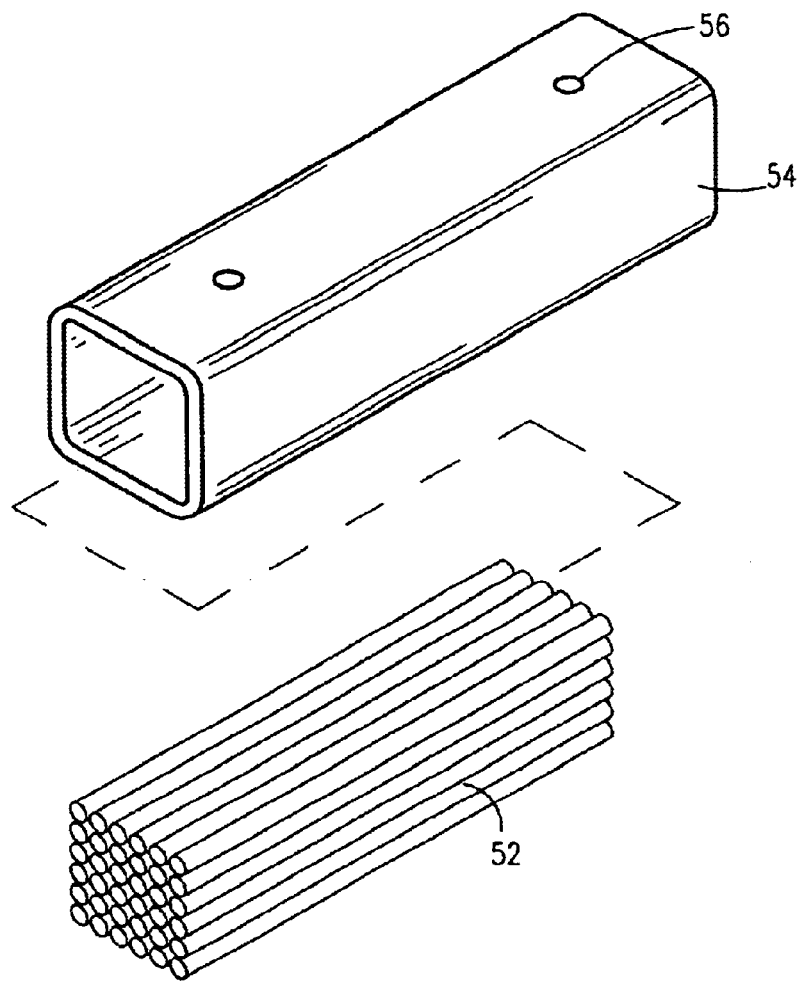
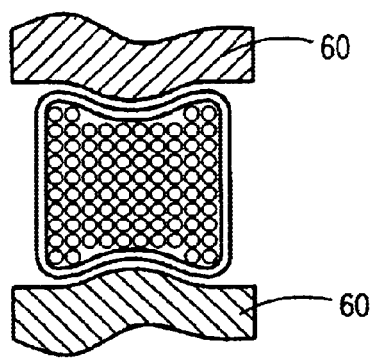 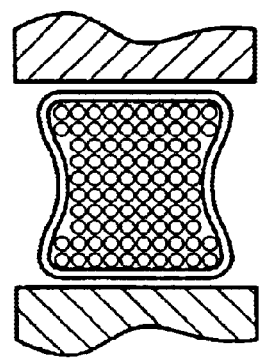

TRACK LITZ RUNGS AND SHORTING BAR DESIGN FOR URBAN MAGLEV INDUCTRACK AND METHOD FOR MAKING THE SAME

RELATED APPLICATIONS

There are no previously filed, nor currently any co-pending applications, anywhere in the world.

BACKGROUND OF THE INVENTION

1. Field of the Invention

The present invention relates generally to urban inductrack maglev systems utilizing Halbach arrays and, more particularly, to an improved close-packed shorted circuits track elements for use therewith.

2. Description of the Related Art

Halbach arrays utilize cross-magnetized magnet bars in an array is to enhance the periodic magnetic field at the front face of the array, while canceling it at back face of the array. Not only is the field enhanced, but analysis shows that in a long array the horizontal and vertical components are nearly purely sinusoidal in their spatial variation, with negligible higher spatial harmonics.

Such a system is currently under construction as part of the Department of Transportation's Urban Magnetic Levitation Transit Technology Development Program being administered under the Federal Transit Administration. Such a system being built is a prototype for testing of lower-speed applications of magnetic levitation, such as for urban train systems, and is attempting to employ systems that are simple in construction and operation and that have low drag at urban speeds.

The first-proposed Inductrack disclosed in U.S. Pat. No. 5,722,326, titled "Magnetic Levitation System For Moving Objects", referred to herein as Inductrack I, employs special arrays of permanent magnets ("Halbach arrays"), on the moving train car to produce the levitating magnetic fields. These fields interact with a close-packed ladder-like array of shorted circuits in the "track" to levitate the train car. In this first form of the Inductrack, single arrays moving above the track produced the levitation. In the Inductrack maglev system Halbach arrays are used, located below the train car. When in motion the magnetic field of these arrays then induces currents in a special "track" made up of close-packed shorted circuits. The close-packed shorted circuits consist of a series of conductive rungs electrically connected at the ends. The rungs consist of stainless steel tubing swaged over Litz cables. Litz cables are actually stranded film insulated conductors, or stranded magnet wires, which are cabled into a geometric pattern permitting each wire to occupy every possible position in the entire length of the cable at some point. The reason for this arrangement is to reduce losses caused by the tendency of currents to flow only on the outside surface of wires at high frequencies. The Litz cable carries the induced current from a changing magnetic field, which in turn proives the magnetic lift. The stainless steel tubing around the Litz cable carries the vehicle weight due to the magnetic levitation. The Litz track rungs are soldered into a copyer shorting bar that allows the current to pass between the rungs.

The present invention deals directly with an improvement in design and manufacture of the making up the Litz rungs and shorting bars of the close-packed shorted circuits.

A search of the prior art did not disclose any patents that read directly on the claims of the instant invention; however, the following references were considered related:

| U.S. Pat. No. | Inventor | Issue Date |
| --- | --- | --- |
| 6,633,217 | Post | Oct. 14, 2003 |
| 5,722,326 | Post | Mar. 3, 1998 |
| 6,629,503 | Post | Oct. 7, 2003 |
| 6,510,799 | Lamb et al. | Jan. 28, 2003 |

Consequently, a need currently exists for providing improvements in design, construction and costs for any component used in an urban inductrack maglev systems utilizing Halbach arrays.

SUMMARY OF THE INVENTION

It is therefore an object of the present invention to provide an improved track Litz rungs and shorting bar design for urban maglev inductrack.

It is a feature of the present invention to provide an improved process for making Litz rungs for use with an Urban Maglev Inductrack.

Briefly described according to the preferred embodiment of the present invention, improved Litz track rungs for urban Maglev Inductrack use is disclosed, as well as an improved method for making the same. Rather than using a stainless steel plate and forming the square tube around the required copper Litz cable, a standard square stainless steel tube is formed by itself using otherwise conventional means. Each tube is cut to length and otherwise worked to the required specification, particularly, relief holes can be drilled that allow for release of gases that are generated when the rails are soldered to form the electrical connection with the shorting bars. After being worked, the tubes are annealed by heat treating at 1900 degrees, thereby removing the strain and stress hardening generated during the process of forming the square shaped stainless steel tube. An additional unrealized side effect of the annealing process is the removal of the slight magnetism generated into the stainless steel tube by the metal working process. Subsequently, a stress relieved, demagnetized square tube is thereby provided for further manufacture by installation of a square packed Litz cable within the square tube and compression of the rail using a punch press or brake to compact and compress the rail, thereby minimizing electrical resistance and increasing overall electrical conductivity of the rail.

An advantage of the present invention is that improved close-packed shorted circuits track elements are created.

Another advantage of the present invention is that improved close-packed shorted circuit track elements are created having less stress hardening generated during their formation.

Another advantage of the present invention is that Maglev inductrack rungs are formed having a lower interfering permanent magnetic field within the stainless steel outer shell.

Another advantage of the present invention is that Maglev inductrack rungs are formed in the absences of flood cooling, thereby reducing problems associated with increased levels of internal moisture.

Further, a preferred embodiment of the present invention can hereafter be formed using standardized, commodity materials rather than utilizing a custom fabrication method, thereby greatly reducing the cost of a component used in great quantity in building an system utilizing Halbach arrays.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7 through 9 depict the general steps of manufacturing the Litz Track Rungs 40 for use within the Maglev Inductrack according FIG. 6.

DESCRIPTION OF THE PREFERRED EMBODIMENTS

Figure 1:
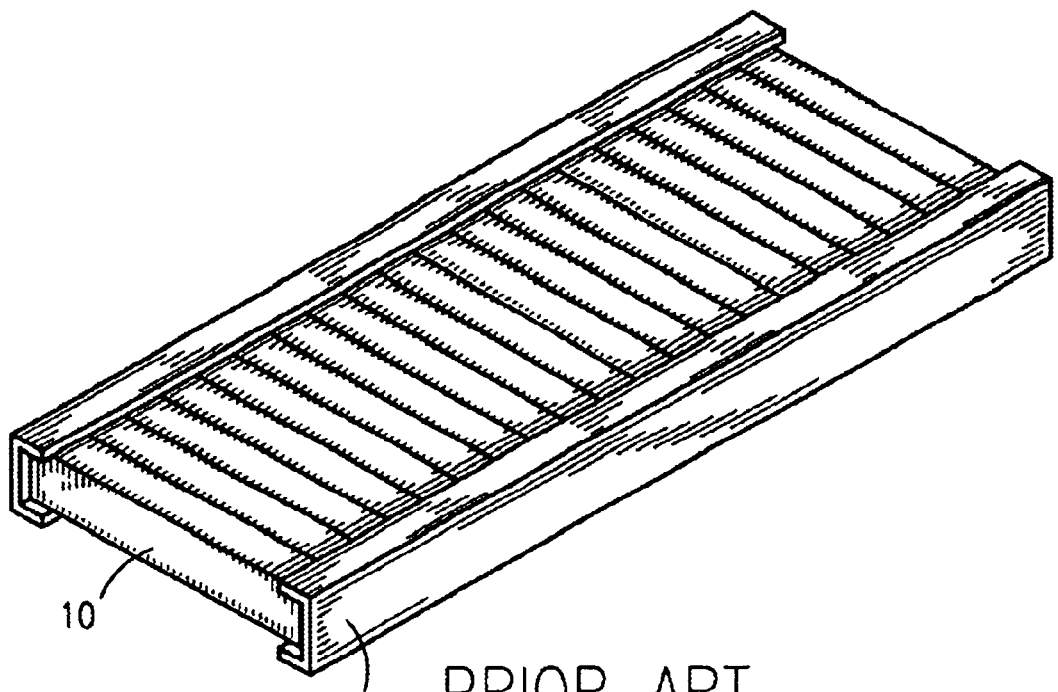
FIG. 1 is a perspective view of a segment of a Maglev Inductrack according to the PRIOR ART.
Figure 2:
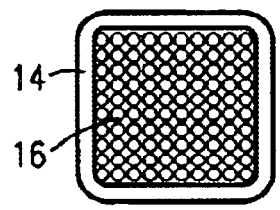
FIG. 2 through 4 depict the general steps of manufacturing the Litz Track Rungs for use within the Maglev Inductrack according to the PRIOR ART.
Figure 3:
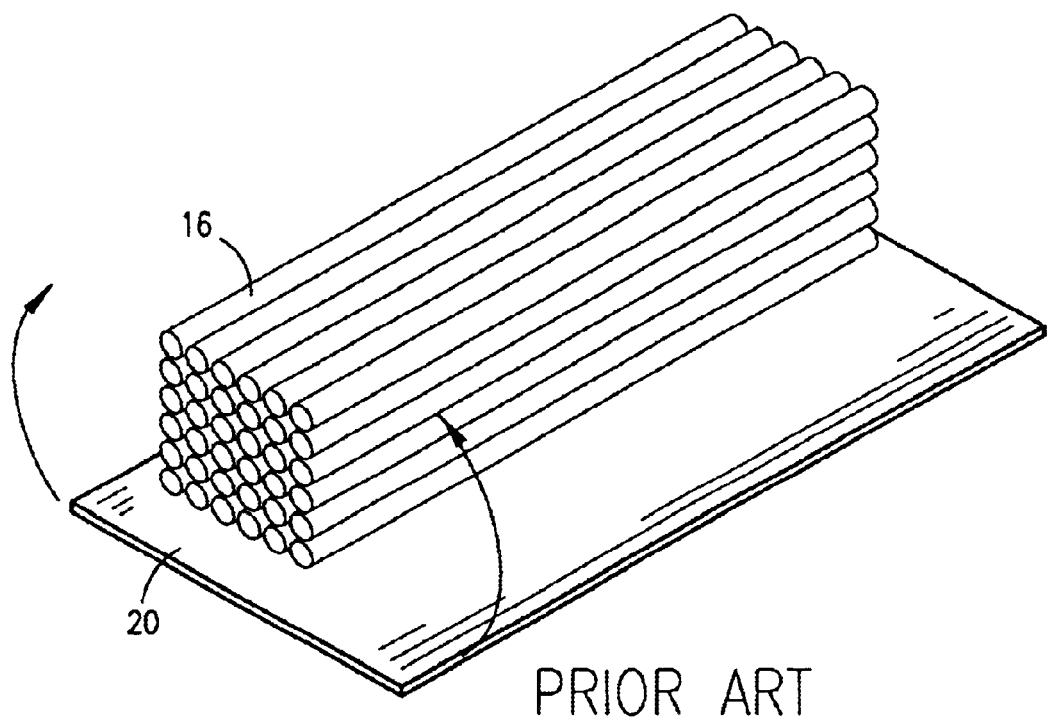
Figure 4:
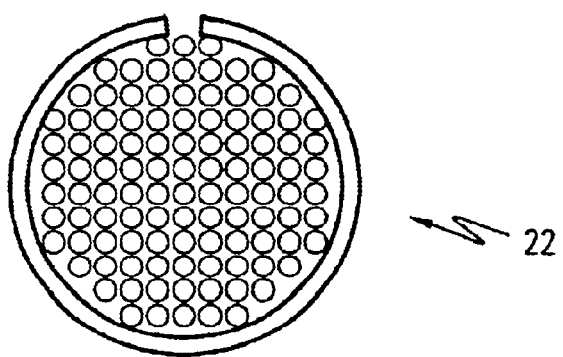
Figure 5:
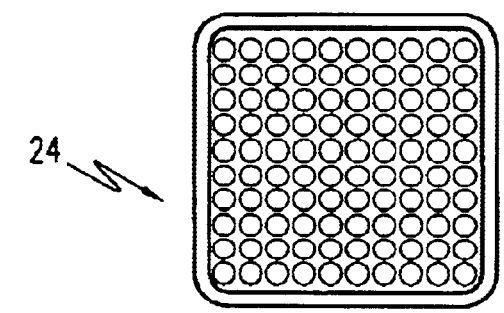
FIG. 5 is an end elevational view of a completed Litz Track Rung according to the PRIOR ART.

In order to describe the complete relationship of the invention, it is essential that some description be given to the manner and practice of functional utility and description of the formation of the Litz rungs and shorting bars currently used in building a Maglev Inductrack. According to the PRIOR ART and FIG. 1–5, a plurality of Litz Track Rungs 10 are laterally aligned and electrically connected at each end to a shorting guideway 12. Each rung 10 consists of a stainless steel tube 14 swaged over Litz cable 16. Because of design requirements, it is necessary to provide the highest level of compaction of Litz cable 16 within the tube 14 and, as such, the general process of FIG. 3–5 is used. According to this process, a stainless, steel plate 20 is provided along with a segment of Litz cable 16. The plate 20 is drawn around the Litz cable 16 such as to form a cylindrical, packed tube 22. Thereafter, the tube 22 is further formed such as to have a square cross sectional area 24 and, eventually, to the required specification as shown in FIG. 2. However, throughout this process a great deal of heat can be generated, with the stainless steel thereby becoming work hardened and magnetized. Further still, because of the lower melting point of the copper conductors forming the Litz cable, to insure that the cable is not melted the draw forming process includes flood cooling of the internal conduit during working in order to remove the generated heat. This flood cooling process can also result in increased moisture levels within the finished track rung.

The best mode for carrying out the present invention is presented in terms of its preferred embodiment, herein depicted within the Figures.

Figure 6:
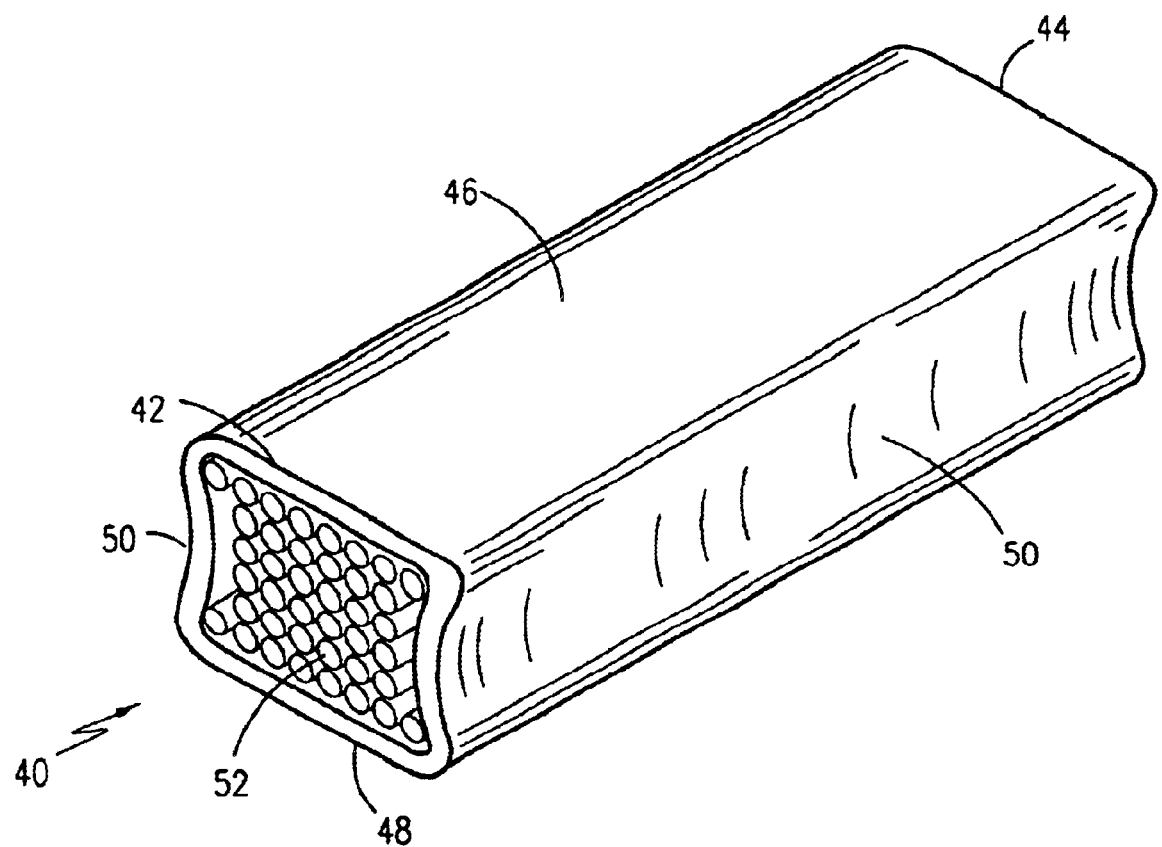
FIG. 6 s a perspective view of an improved Litz track rung 40 according to the preferred embodiment of the present invention.

1. Detailed Description of the Figures Referring now to FIG. 6, an improved Litz track rung 40 is shown, according to the present invention, anticipated for use with a maglev inductrack system, but capable of being applied to any system utilizing Halbach arrays. The track rung 40 is formed as a linearly elongated member having a first shorting bar attachment end 42 opposite a second shorting bar attachment end 44, both ends 42, 44 anticipated as being electrically attached by soldier or other means to an electrically conductive shorting bar (not shown). The rung 40 is formed of a stainless steel outer shell having a flat upper surface 46 parallel and opposite to a flat lower surface 48, and connected by a pair of slightly concave sidewalls 50. Packed inside the outer shell is a Litz cable 52 formed of a plurality of strands of copper conductors.

Referring to FIG. 7–9, the process and method for making the improved Litz track rung of the present invention is depicted. Starting with a stainless steel square tubestock 54 made by conventionally available methods, such tubestock raw material can be procured as a commodity product. Further, the required copper Litz cable 52 can be procured pre-formed having a square shaped cross section. Each tube 54 is cut to length and otherwise worked to the required specification, particularly, relief holes 56 can be drilled that allow for release of gases that are generated when the rungs are soldered to form the electrical connection with the shorting bars. After being worked, the tubes are annealed by heat treating at 1900 degrees, thereby removing the strain and stress hardening generated during the process of forming the square shaped stainless steel tube. This cannot be done using the conventional methods because the annealing temperature of stainless steel is above the melting point of the copper forming the Litz cable. An additional unrealized side effect of the annealing process is the removal of the slight magnetism generated into the stainless steel tube by the metal working process. Subsequently, a stress relieved, demagnetized square tube is thereby provided for further manufacture by installation of a square packed Litz cable 52 within the square tube. As shown in greater detail in conjunction with FIG. 5A and FIG. 5B, compression of the packed tube 54 using a punch press or brake 60 to compact and compress the rail 50, thereby minimizing electrical resistance and increasing overall electrical conductivity of the rail while forming the required overall outer dimensions.

2. Operation of the Preferred Embodiment

Subsequent to forming the Litz track rails of the present invention using the method disclosed above, the present invention is subsequently utilized as with conventional track rails, i.e. the Litz track rungs are soldered into a copper shorting bar that allows the current to pass between the rungs. To use the present invention, the decrease of internal moisture trapped from flood cooling, the increase compaction of cable due to the compression steps, and the decreased imparted magnetic field generated by the formed stainless steel all result in an Maglev Inductrack that provides superior strength and magnetic field induction capacity over the present, conventionally available methods.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. In a magnetic levitation induction track having a close-packed ladder-like array of shorted circuits in a track to levitate a train car, said track formed of a series of conductive rungs electrically connected at ends to a conductive shorting means, wherein the improvement comprises:

each said conductive track rung formed as a linearly elongated member having a first shorting bar attachment end opposite a second shorting bar attachment end and formed of a stainless steel outer shell having a flat upper surface parallel and opposite to a flat lower surface, and connected by a pair of slightly concave sidewalls; and a Litz cable formed of a plurality of strands of copper conductors packed within said stainless steel outer shell.

2. The improvement of claim 1, wherein said stainless steel outer shell is annealed.

3. A method for making the improved Litz track rung of claim 1, said method comprising the steps:

a. Obtaining stainless steel square tubestock made by otherwise conventional methods;

b. Forming said tubestock to the required length and general configuration;

c. Removing work hardening and magnetism generated within said tubestock;

d. Obtaining a square packed Litz cable pre-formed having a square shaped cross section;

e. Installing said square packed Litz cable within said tubestock.

4. The method of claim 3, further comprising the steps:

a. Compressing said rung to the desired overall outer dimensions.

5. The method of claim 3, further comprising the steps:

a. Forming a pair of slightly concave sidewalls to said rung; and b. Flatting an upper rung surface and a lower rung surface.

6. The method of claim 3, wherein removing work hardening and magnetism generated within said tubestock is done by annealing said tubestock.

7. The method of claim 3, wherein removing work hardening and magnetism generated within said tubestock is done by heat treating at 1900 degrees Fahrenheit.

8. A method for making an improved Litz track rung comprising the steps.

a. Forming a square stainless steel tube;

b. Removing work hardening and magnetism generated within said tubestock;

c. Forming a square packed Litz cable; and d. Inserting said Litz cable within said tubestock.

9. The method of claim 8, further comprising the steps a. Compressing said rung to the desired overall outer dimensions.

10. The method of claim 8, further comprising the steps:

a. Forming a pair of slightly concave sidewalls to said rung; and b. Flatting an upper rung surface and a lower rung surface.

11. The method of claim 8, wherein removing work hardening and magnetism generated within said tubestock is done by annealing said tubestock.

12. The method of claim 8, wherein removing work hardening and magnetism generated within said tubestock is done by heat treating at 1900 degrees Fahrenheit.

* * * * *